(12) United States Patent
Romero et al.

(10) Patent No.: US 12,517,195 B2
(45) Date of Patent: Jan. 6, 2026

(54) LOW RESIDUAL OFFSET SENSOR

(71) Applicant: Allegro MicroSystems, LLC, Manchester, NH (US)

(72) Inventors: Hernán D. Romero, Buenos Aires (AR); Pablo Castro Lisboa, Montevideo (UY)

(73) Assignee: Allegro MicroSystems, LLC, Manchester, NH (US)

( * ) Notice: Subject to any disclaimer, the term of this patent is extended or adjusted under 35 U.S.C. 154(b) by 266 days.

(21) Appl. No.: 18/527,675

(22) Filed: Dec. 4, 2023

(65) Prior Publication Data

US 2025/0180677 A1 Jun. 5, 2025

(51) Int. Cl.
*G01R 33/09* (2006.01)

(52) U.S. Cl.
CPC .................................. *G01R 33/098* (2013.01)

(58) Field of Classification Search
CPC .. G01R 33/098; G01R 33/0017; G01R 33/09; G01R 33/094
See application file for complete search history.

(56) References Cited

U.S. PATENT DOCUMENTS

| | | | |
|---|---|---|---|
| 4,709,214 A | 11/1987 | Higgs | |
| 5,594,173 A | 1/1997 | Frey et al. | |
| 5,694,038 A | 12/1997 | Moody | |
| 6,043,644 A | 3/2000 | de Coulon et al. | |
| 6,100,680 A | 8/2000 | Vig | |
| 6,690,155 B2 | 2/2004 | Vig | |
| 7,138,793 B1 | 11/2006 | Bailey | |
| 7,276,885 B1 * | 10/2007 | Tagare | G05F 1/577 323/267 |
| 7,705,586 B2 | 4/2010 | van Zon et al. | |
| 7,800,389 B2 | 9/2010 | Friedrich et al. | |
| 7,923,996 B2 | 4/2011 | Doogue et al. | |
| 8,030,918 B2 | 10/2011 | Doogue et al. | |

(Continued)

FOREIGN PATENT DOCUMENTS

EP  1 797 496 B1  7/2009
EP  3 954 971 A1  2/2022

OTHER PUBLICATIONS

U.S. Appl. No. 18/354,709, filed Jul. 19, 2023, Hein, et al.

(Continued)

*Primary Examiner* — Alesa Allgood
(74) *Attorney, Agent, or Firm* — Daly, Crowley, Mofford & Durkee, LLP

(57) ABSTRACT

A system, comprising: a sensing element including a plurality of resistive elements; a switching matrix that is configured to change a total resistance of the sensing element by bringing online or offline one or more of the plurality of resistive elements, the total resistance of the sensing element, at any point in time, being based on respective resistances of only those of the plurality of resistive elements that are currently online; a matrix controller that is configured to detect when a value of a counter signal is updated and cause the switching matrix to change the total resistance of the sensing element by bringing offline or online one or more of the plurality of resistive elements based on the value of the counter signal; and a counter signal generator configured to detect whether an offset signal satisfies a predetermined condition and update the value of the counter signal.

31 Claims, 9 Drawing Sheets

(56) References Cited

U.S. PATENT DOCUMENTS

| | | |
|---|---|---|
| 8,269,491 B2 | 9/2012 | Cummings et al. |
| 8,350,563 B2 | 1/2013 | Haas et al. |
| 8,447,556 B2 | 5/2013 | Friedrich et al. |
| 8,542,010 B2 | 9/2013 | Cesaretti et al. |
| 8,680,846 B2 | 3/2014 | Cesaretti et al. |
| 8,692,546 B2 | 4/2014 | Cesaretti et al. |
| 8,736,369 B2 | 5/2014 | Petrie |
| 8,818,749 B2 | 8/2014 | Friedrich et al. |
| 9,046,562 B2 | 6/2015 | Cummings et al. |
| 9,052,349 B2 | 6/2015 | Haas et al. |
| 9,151,807 B2 | 10/2015 | Friedrich et al. |
| 9,605,975 B2 | 3/2017 | Foletto et al. |
| 9,810,519 B2 | 11/2017 | Taylor et al. |
| 10,120,017 B2 | 11/2018 | Moody et al. |
| 10,254,103 B2 | 4/2019 | Taylor et al. |
| 10,310,028 B2 | 6/2019 | Latham et al. |
| 10,324,141 B2 | 6/2019 | Latham et al. |
| 10,444,299 B2 | 10/2019 | Romero et al. |
| 10,481,219 B2 | 11/2019 | Romero et al. |
| 10,613,158 B2 | 4/2020 | Cook et al. |
| 10,641,842 B2 | 5/2020 | Latham et al. |
| 10,763,219 B2 | 9/2020 | Almiron et al. |
| 10,837,943 B2 | 11/2020 | Romero |
| 10,917,092 B2 | 2/2021 | Romero |
| 10,996,289 B2 | 5/2021 | Latham et al. |
| 11,047,933 B2 | 6/2021 | Romero et al. |
| 11,073,577 B2 | 7/2021 | Romero et al. |
| 11,125,837 B2 | 9/2021 | Kulla |
| 11,143,732 B2 | 10/2021 | Romero et al. |
| 11,262,422 B2 | 3/2022 | Romero |
| 11,408,948 B2 | 8/2022 | Lassalle-Balier |
| 11,467,233 B2 | 10/2022 | Lassalle-Balier et al. |
| 11,493,361 B2 | 11/2022 | Romero |
| 11,555,872 B2 | 1/2023 | Romero |
| 11,609,283 B2 | 3/2023 | Romero |
| 11,624,791 B2 | 4/2023 | Romero |
| 11,927,650 B2 | 3/2024 | Romero |
| 2007/0247141 A1 | 10/2007 | Pastre et al. |
| 2009/0024889 A1 | 1/2009 | Forrest et al. |
| 2015/0022193 A1 | 1/2015 | Burdette et al. |
| 2015/0022198 A1 | 1/2015 | David et al. |
| 2016/0025820 A1 | 1/2016 | Scheller et al. |
| 2016/0139199 A1 | 5/2016 | Petrie et al. |
| 2016/0307683 A1* | 10/2016 | Davis ............... E05B 47/02 |
| 2018/0340986 A1 | 11/2018 | Latham et al. |
| 2018/0340989 A1 | 11/2018 | Latham et al. |
| 2019/0025346 A1 | 1/2019 | Latham |
| 2019/0079146 A1 | 3/2019 | Romero et al. |
| 2019/0312579 A1 | 10/2019 | Romero |
| 2020/0022529 A1 | 1/2020 | Jalali et al. |
| 2020/0225298 A1 | 7/2020 | Latham et al. |
| 2021/0181269 A1 | 6/2021 | Ishida et al. |
| 2022/0076105 A1 | 3/2022 | Foroutan et al. |
| 2022/0214410 A1 | 7/2022 | Romero |
| 2022/0236347 A1 | 7/2022 | Romero |
| 2022/0308131 A1 | 9/2022 | Romero |
| 2023/0027608 A1 | 1/2023 | Romero |
| 2023/0124351 A1 | 4/2023 | Lutz |
| 2023/0204693 A1 | 6/2023 | Romero |
| 2024/0168104 A1 | 5/2024 | Javvaji et al. |

OTHER PUBLICATIONS

U.S. Appl. No. 18/615,267, filed Mar. 25, 2024, Cesaretti, et al.
J. Mathon, "Theory of Tunneling Magnetoresistance;" *Phase Transitions*, vol. 76, Nos. 4-5; Jan. 2003; pp. 491-500; 11 Pages.
Pong et al., "Enhancement of Tunneling Magnetoresistance by Optimization of Capping Layer Thickness in CoFeB/MgO/CoFeB Magnetic Tunnel Junctions;" Journal of Applied Physics, vol. 105, No. 7; Apr. 2009; 3 Pages.
U.S. Non-Final Office Action dated Apr. 23, 2020 for U.S. Appl. No. 15/901,135; 17 pages.
Response to U.S. Non-Final Office Action dated Apr. 23, 2020 for U.S. Appl. No. 15/901,135; Response filed Jul. 17, 2020; 10 pages.
U.S. Final Office Action dated Sep. 3, 2020 for U.S. Appl. No. 15/901,135; 15 pages.
Response to U.S. Final Office Action dated Sep. 3, 2020 for U.S. Appl. No. 15/901,135; Response filed Nov. 23, 2020; 13 pages.
U.S. Non-Final Office Action dated Apr. 12, 2021 for U.S. Appl. No. 15/901,135; 16 pages.
Response to U.S. Final Office Action dated Apr. 12, 2021 for U.S. Appl. No. 15/901,135; Response filed May 25, 2021; 11 pages.
U.S. Notice of Allowance dated Aug. 17, 2021 for U.S. Appl. No. 15/901,135; 9 pages.
Notice of Allowance Dated Apr. 7, 2021 for U.S. Appl. No. 16/533,030, 10 pages.
U.S. Notice of Allowance dated Jul. 29, 2022 for U.S. Appl. No. 17/140,429; 16 Pages.
$1^{st}$ Amendment under Rule 312 filed on Aug. 15, 2022 for U.S. Appl. No. 17/140,429; 5 Pages.
$2^{nd}$ Amendment under Rule 312 filed on Oct. 3, 2022 for U.S. Appl. No. 17/140,429; 7 Pages.
Notice of Allowance dated Jan. 18, 2024, for U.S. Appl. No. 17/659,515; 11 pages.
Extended European Search Report dated Oct. 28, 2022 for European Application No. 22172865.2; 8 Pages.
Response to Extended European Search Report dated Oct. 28, 2022, for European Patent Application No. 22172865.2; Response filed Nov. 27, 2023; 13 pages.
Notice of Allowance dated Feb. 6, 2023 for U.S. Appl. No. 17/140,429; 10 Pages.

* cited by examiner

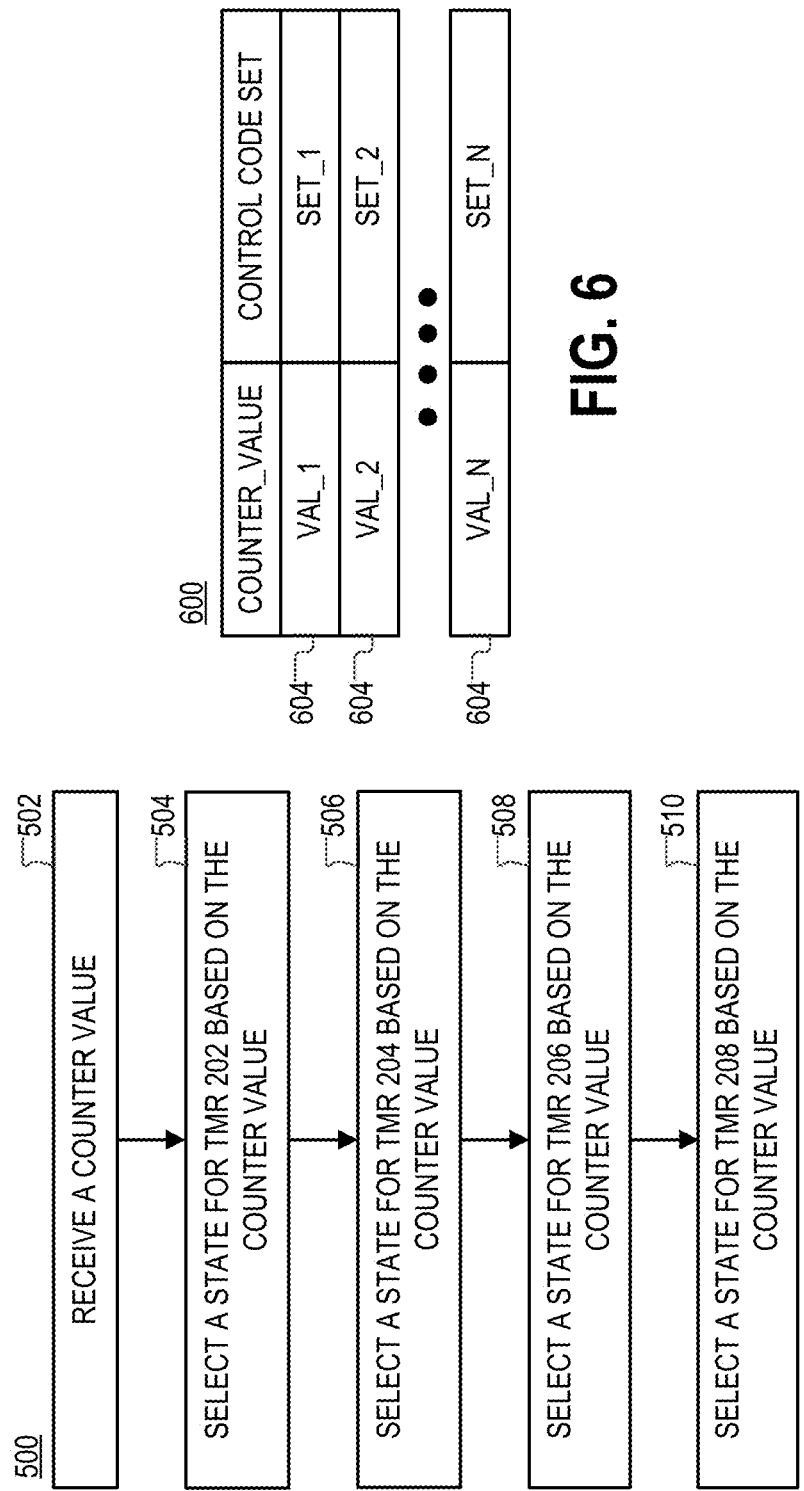

LOW RESIDUAL OFFSET SENSOR

BACKGROUND

As is known, sensors are used to perform various functions in a variety of applications. Some sensors include one or more electromagnetic flux sensing elements, such as a Hall effect element, a magnetoresistive element, or a receiving coil to sense an electromagnetic flux associated with proximity or motion of a target object. Sensor integrated circuits are widely used in automobile control systems and other safety-critical applications. There are a variety of specifications that set forth requirements related to permissible sensor quality levels, failure rates, and overall functional safety.

SUMMARY

According to aspects of the disclosure, a system is provided, comprising: a sensing element including a plurality of resistive elements that are configured to form a circuit; a switching matrix that is configured to change a total resistance of the sensing element by bringing online or offline one or more of the plurality of resistive elements, the total resistance of the sensing element, at any point in time, being based on respective resistances of only those of the plurality of resistive elements that are currently online; a matrix controller that is configured to detect when a value of a counter signal is updated and cause the switching matrix to change the total resistance of the sensing element by bringing offline or online one or more of the plurality of resistive elements based on the value of the counter signal, wherein the causing step is performed when the value of the counter signal is updated; and a counter signal generator configured to detect whether an offset signal satisfies a predetermined condition and update the value of the counter signal in response to the offset signal satisfying the predetermined condition.

According to aspects of the disclosure, a system is provided, comprising: a sensing element including a plurality of resistive elements that are configured to form a circuit; a switching matrix that is configured to change a total resistance of the sensing element by bringing online or offline one or more of the plurality of resistive elements, the total resistance of the sensing element, at any point in time, being based on respective resistances of only those of the plurality of resistive elements that are currently online; a matrix controller that is configured to detect when a value of a counter signal is updated and cause the switching matrix to change the total resistance of the sensing element by bringing offline or online one or more of the plurality of resistive elements based on the value of the counter signal, wherein the causing step is performed when the value of the counter signal is updated; and a counter signal generator configured to detect whether an offset signal satisfies a predetermined condition and update the value of the counter signal in response to the offset signal satisfying the predetermined condition.

According to aspects of the disclosure, a system is provided, comprising: a sensing bridge including a plurality of magnetic field sensing elements, each of the plurality of magnetic field sensing elements including a different respective set of resistive elements, each respective set of resistive elements being configured to form a different one of a plurality of circuits; a switching matrix that is configured to change a respective total resistance of any of the plurality of magnetic field sensing elements by bringing online or offline one or more of the resistive elements that are part of that magnetic field sensing element, the respective total resistance of each of the plurality of magnetic field sensing elements, at any point in time, being based on respective resistances of only those of the resistive elements that are part of the magnetic field sensing element which are currently online; a matrix controller that is configured to detect when a value of a counter signal is updated and cause the switching matrix to change the respective total resistance of at least one of the plurality of magnetic field sensing elements based on the value of the counter signal, wherein the causing step is performed when the value of the counter signal is updated; a counter signal generator configured to update the value of the counter signal when a predetermined condition is satisfied by an offset signal that is associated with the sensing bridge.

BRIEF DESCRIPTION OF THE DRAWINGS

The foregoing features may be more fully understood from the following description of the drawings in which:

FIG. 5 is a flowchart of an example of a process, according to aspects of the disclosure;

FIG. 6 is a diagram of an example of a data structure, according to aspects of the disclosure.

DETAILED DESCRIPTION

Figure 1A:
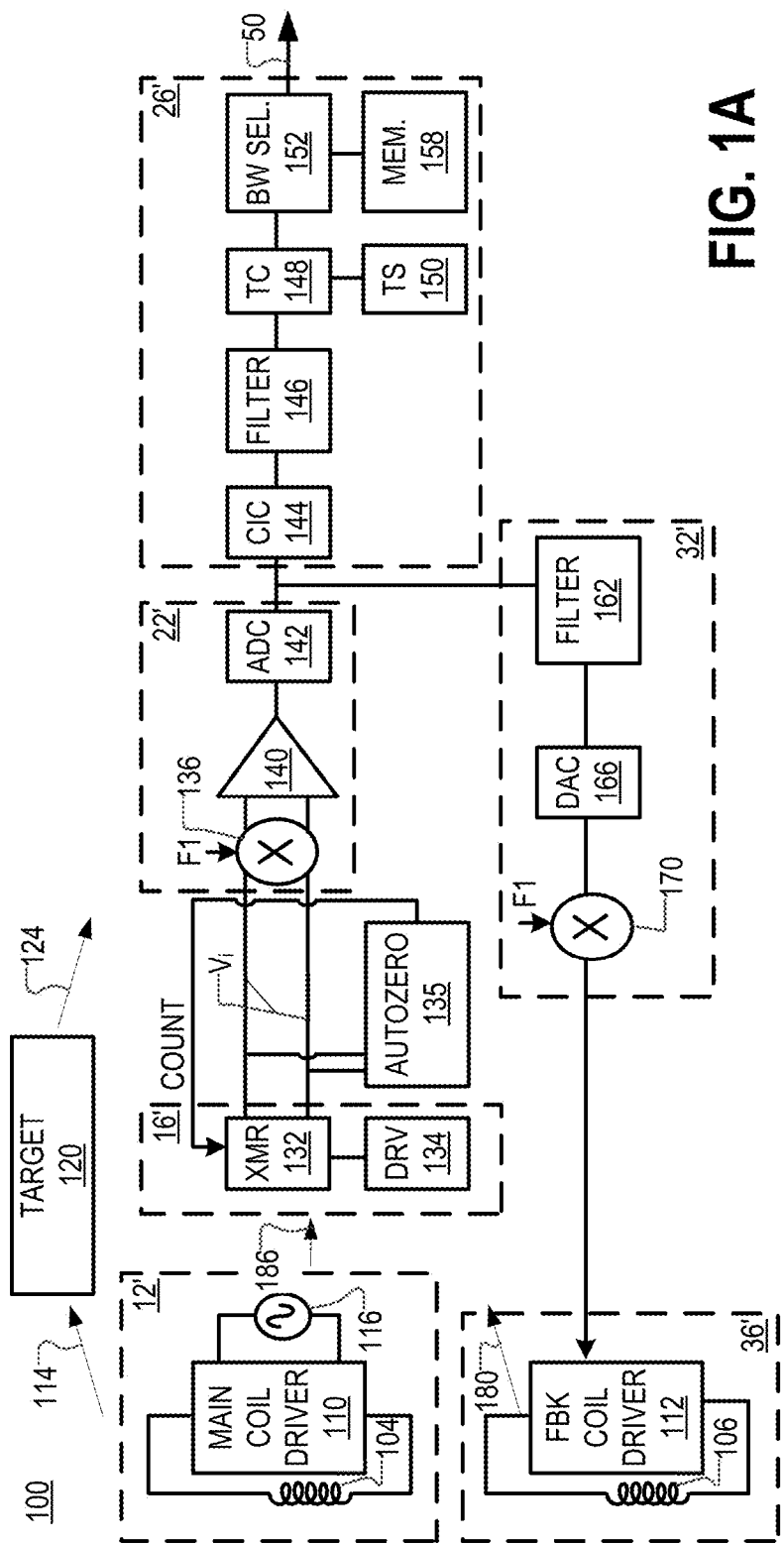
FIG. 1A is a diagram of an example of a sensor, according to aspects of the disclosure.

FIG. 1A is a diagram of a magnetic field sensor 100, according to aspects of the disclosure. The magnetic field sensor 100 includes main coil circuitry 12', magnetoresistance circuitry 16', analog circuitry 22', digital circuitry 26', feedback circuitry 32', and secondary coil circuitry 36'.

In one example, the main coil circuitry 12' may include a main coil 104, a coil driver circuit 110 and a source 116 (e.g., a current source or a voltage source). The source 116 provides an AC current $I_{MC}$ at a first frequency F1. In one example, the first frequency F1 is between 1 and 8 MHz.

The current $I_{MC}$ enables the coil driver circuit 110 to power the main coil 104 to generate a magnetic field signal 114. In one example, the main coil 104 has a coupling factor $K_{MC}$ of 60 Gauss per amp.

In one example, the magnetoresistance circuitry 16' includes a sensing bridge 132 and a driver 134 that drives the sensing bridge 132. The sensing bridge 132 may receive a magnetic-field error signal 186, which is converted into a differential output voltage signal called herein an error signal $V_i$. Under the nomenclature of the present disclosure, the signal $V_i$ is called an error signal because it carries an error, but it can also be thought of as the raw output of sensing bridge 132. In other words, signal $V_i$ may be thought of as the result of the magnetic error signal, generated as the difference between the sum of the magnetic field generated by the main coil 104 and the reflected field from target 120, minus the feedback coil field. Ideally this subtraction should yield zero if the loop had infinite loop gain. Since realistic loops have finite (although large) gains, the error signal will not be zero, although very small. The sensing bridge 132 may be a half-bridge or a full bridge (e.g., a Wheatstone bridge circuit). According to the present example, the sensing bridge 132 includes a plurality of tunneling magnetoresistance elements (TMRs). However, the present disclosure is not limited to any specific type of sensing element being included in the sensing bridge 132. For example, in some implementations, the sensing bridge 132 may include giant magnetoresistance elements (GMRs), Hall elements, and/or any other suitable type of magnetic field sensing element, for as long as the magnetic field sensing element is formed of sub-units (such as pillars), which could be selectively turned on and off to adjust the resistance of the sensing element. Although, in the present example, circuit 132 is a bridge circuit, alternative implementations are possible in which circuit 132 is a serial circuit and/or any other suitable type of circuit. Stated succinctly, the present disclosure is not limited to any specific topology for connecting the magnetic field sensing elements that are part of sensor 100.

In one example, the analog circuitry 22' may include a mixer 136, an amplifier 140, and an analog-to-digital converter (ADC) 142.

The mixer 136 receives the error signal $V_i$ from the magnetoresistance circuitry 16' and demodulates the error signal $V_i$ with the first frequency to form a baseband signal. The baseband signal is amplified by the amplifier 140 by a gain A. The amplified baseband signal is converted from an analog signal to a digital signal by the ADC 142. In one example, the ADC 142 may be a sigma-delta ADC.

The digital circuitry 26' is an example of the digital circuitry 26. In one example, the digital circuitry 26' may include a cascaded integrator-comb (CIC) filter 144, a filter 146, a temperature correction circuit 148, a temperature sensor 150, a bandwidth (BW) selection circuit 152, and a programming and memory circuit 158.

The CIC filter 144 receives the digital baseband signal from the ADC 142. The filter 146 may be a low pass filter configured to filter noise and other artifacts from output of the CIC filter 144 to produce an output voltage signal $V_o$. The temperature correction circuit 148 may scale the output voltage signal $V_o$ according to temperature (e.g., a temperature measured by the temperature sensor 150). The BW selection circuit 152 provides a further low-pass filtering with a selectable cut-off frequency to generate the output signal 50.

In one example, the feedback circuitry 32' includes a filter 162, a digital-to analog converter (DAC) 166 and a mixer 170. The filter 162 may be a low pass filter configured to filter noise and other artifacts from output of the CIC filter 144. The DAC 166 receives the filtered digital output signal from the filter 162 and converts the filtered digital output signal to an analog signal and converts the filtered digital output signal from a digital voltage signal to an analog current signal. The analog current signal from the DAC 166 is provided to a mixer 170. The mixer 170 mixes the analog current signal with the first frequency F1 to form an AC current signal $I_{SC}$ to enable the secondary coil driver circuit 112 to drive the secondary coil 106.

In one example, the secondary coil circuitry 36' includes a secondary coil 106 and a secondary coil driver circuit 112. The AC current signal $I_{SC}$ enables the secondary coil driver circuit 112 to power the secondary coil 106 to produce the magnetic field signal 180. In one example, the secondary coil 106 has a coupling factor $K_{SC}$ of 800 Gauss per amp.

The magnetic field signal 180 is combined with the reflected field signal 124, and also any signal directly coupled from the main coil 104 to driver 134, at a medium to form the magnetic-field error signal 186. The medium may be air. The medium may not be on the magnetic field sensor 100.

The magnetic field sensor 100 may be analyzed in terms of the error signal $V_i$, the output $V_o$ and the reflected signal 124 as defined as:

$$V_i = (B_{RF}(x) + B_{mc}) \cdot S_{TMR} - V_o \cdot d \cdot K_{SC} \cdot S_{TMR},$$

where $B_{RF}(x)\cdot$ is the magnetic field signal 114, $B_{mc}$ is the field directly coupled from the main coil 104 and $V_o \cdot d \cdot K_{SC} \cdot S_{TMR}$ is the magnetic field signal 180, and:

$$V_0 = V_i \cdot A = ((B_{RF}(x) + B_{mc}) \cdot S_{TMR} - V_o \cdot d \cdot K_{SC} \cdot S_{TMR}) \cdot A,$$

$$B_{RF(x)} = I_{MC} \cdot K_R(x),$$

$$B_{mc} = I_{MC} \cdot K_d$$

$$K_R(x) = \frac{K_{MC} \cdot K_{cond}}{x^2},$$

$$I_{SC} = V_o \cdot d,$$

where: $S_{TMR}$=TMR sensitivity, d=voltage-to-current feedback gain, $A \cdot S_{TMR}$=loop gain, $B_{RF}(x)$=reflected field as a function of the target's position x, $K_R(x)$=reflected field coupling factor and $K_D$ is the direct field coupling factor from the main coil The output signal $V_o$ may be defined as follows:

$$V_o = \frac{I_{MC} \cdot K_r(x) \cdot S_{TMR} \cdot A}{1 + d \cdot K_{SC} \cdot S_{TMR} \cdot A} + \frac{I_{MC} \cdot K_d(x) \; S_{TMR} \cdot A}{1 + d \cdot K_{SC} \cdot S_{TMR} \cdot A}$$

and the system gain (for $B_{mc}$=0) of the magnetic field sensor 100 may be expressed as:

$$\frac{V_o}{K_R(x)} = \frac{I_{MC} \cdot S_{TMR} \cdot A}{1 + d \cdot K_{SC} \cdot S_{TMR} \cdot A}.$$

Where the term $$\frac{I_{MC} \cdot K_d \; S_{TMR} \cdot A}{1 + d \cdot K_{SC} \cdot S_{TMR} \cdot A}$$

represents the "magnetic offset" of the system, which can be trimmed provided it does not depend on (x)

For $S_{TMR} \cdot A \gg 1$, then the system gain of the magnetic field sensor 100 becomes $$\frac{I_{MC}}{d \cdot K_{SC}}.$$

For a high enough loop gain, the system gain is independent of $S_{TMR}$ and the output voltage $V_o$ is proportional to the reflection coefficient:

$$V_o = K_R \cdot \frac{I_{MC}}{d \cdot K_{SC}}.$$

Thus, the proportionality factor depends on the ratio of the main coil current $I_{MC}$ to the voltage-to-current feedback gain d and the secondary coil coupling factor $K_{SC}$.

Since the reflected signal 124 is modulated at a high frequency, the magnetic-field error signal 186 is demodulated from the first frequency F1 in the forward path down to the baseband for further conditioning. Therefore, the magnetic-field feedback loop remodulates the conditioned signal back to the first frequency F1 before magnetically subtracting it from the originally reflected signal 124.

As described herein, the non-linear behavior of the TMRs in sensing bridge 132 is masked by the magnetic-field closed-loop approach and the overall system gain does not depend on the sensitivity of any of the TMRs in sensing bridge 132. The secondary coil 106 compensates for reflected fields from the target 120 and keeps the TMRs in sensing bridge 132 element at an operating point at or near zero Gauss. In some implementations, target 120 may be a rotating target, in which case the signal output from sensing bridge 132 may be an alternating current (AC) signal.

Magnetic field sensor 100 may be provided with an autozero circuit 135. The autozero circuit 135 may be used to correct any resistive imbalance that might exist between the TMRs in sensing bridge 132. As used herein, the phrase "correct resistive imbalance" refers to making the respective resistances of all (or at least two) of the TMRs equal (or close to being equal—i.e., within a predetermined distance from each other). The autozero circuit 135 may be configured to generate a signal COUNT and provide it to sensing bridge 132, after which the value of the signal COUNT may be used by control circuitry in sensing bridge 132 to select the appropriate resistance for at least one of the TMRs in the sensing bridge 132.

In one example, the term "sensing signal that is at least in part generated by one or more sensing elements" may refer to any of: (i) the raw output (Vi) of sensing bridge 132, the output of demodulator 136, the output of ADC 142, the output of CIC 144, the output of filter 146, or the output of TC 148. The sensing signal, in addition to indicating a useful quantity that is desired to be measured, may also carry noise, offset, and/or other sources of error. Stated succinctly, the phrase "sensing signal that is at least in part generated by one or more sensing elements" may refer to the raw output of the one or more sensing elements or any other signal that is generated by processing the raw output.

Figure 1B:
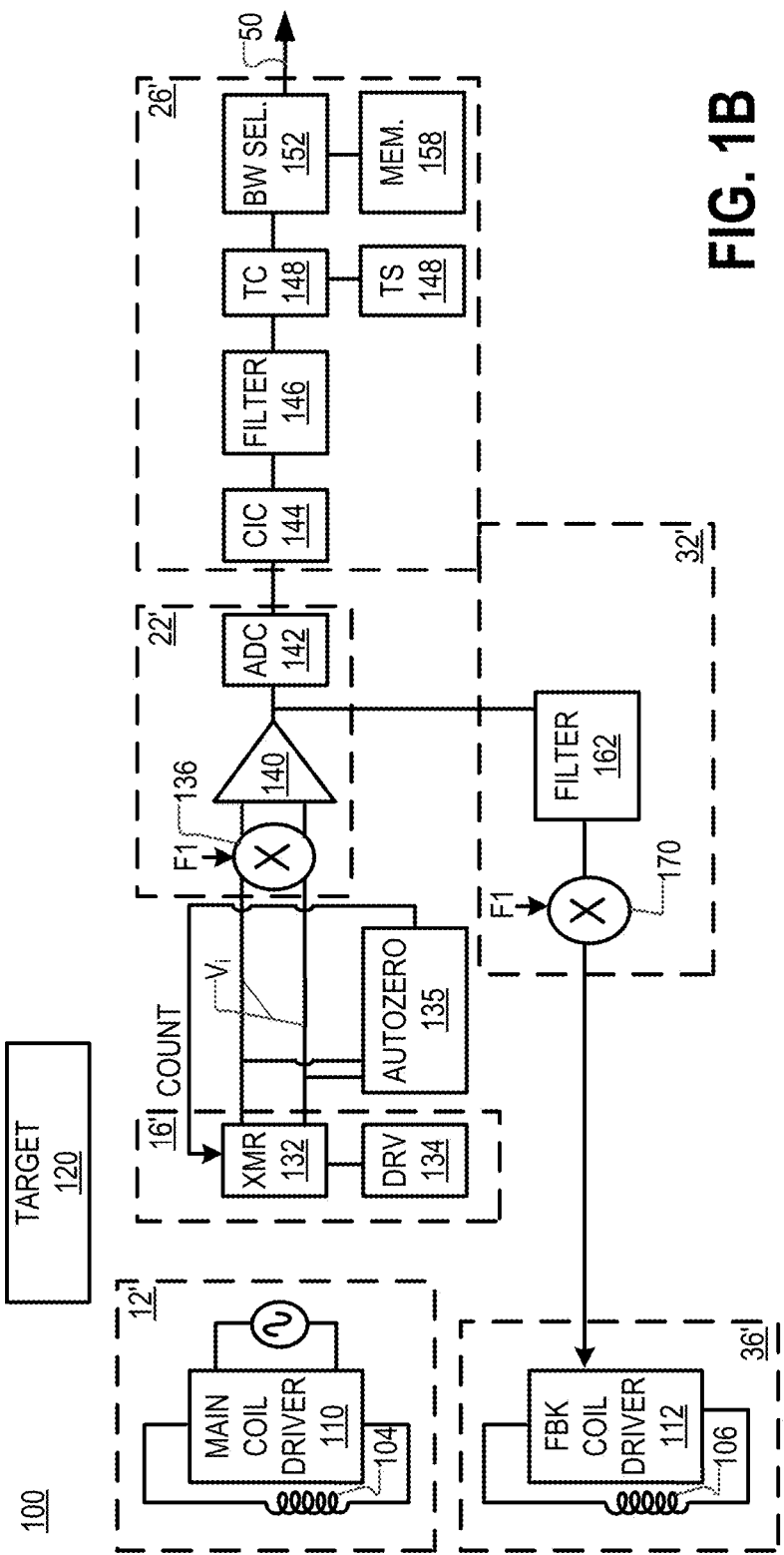
FIG. 1B is a diagram of an example of a sensor, according to aspects of the disclosure.

FIG. 1B shows an alternative implementation of magnetic field sensor 100. In the implementation of FIG. 1B, feedback circuitry 32' is configured to operate in the analog domain. Apart from this distinction, the system shown in FIG. 1B is identical to the system shown in FIG. 1A.

Figure 2:
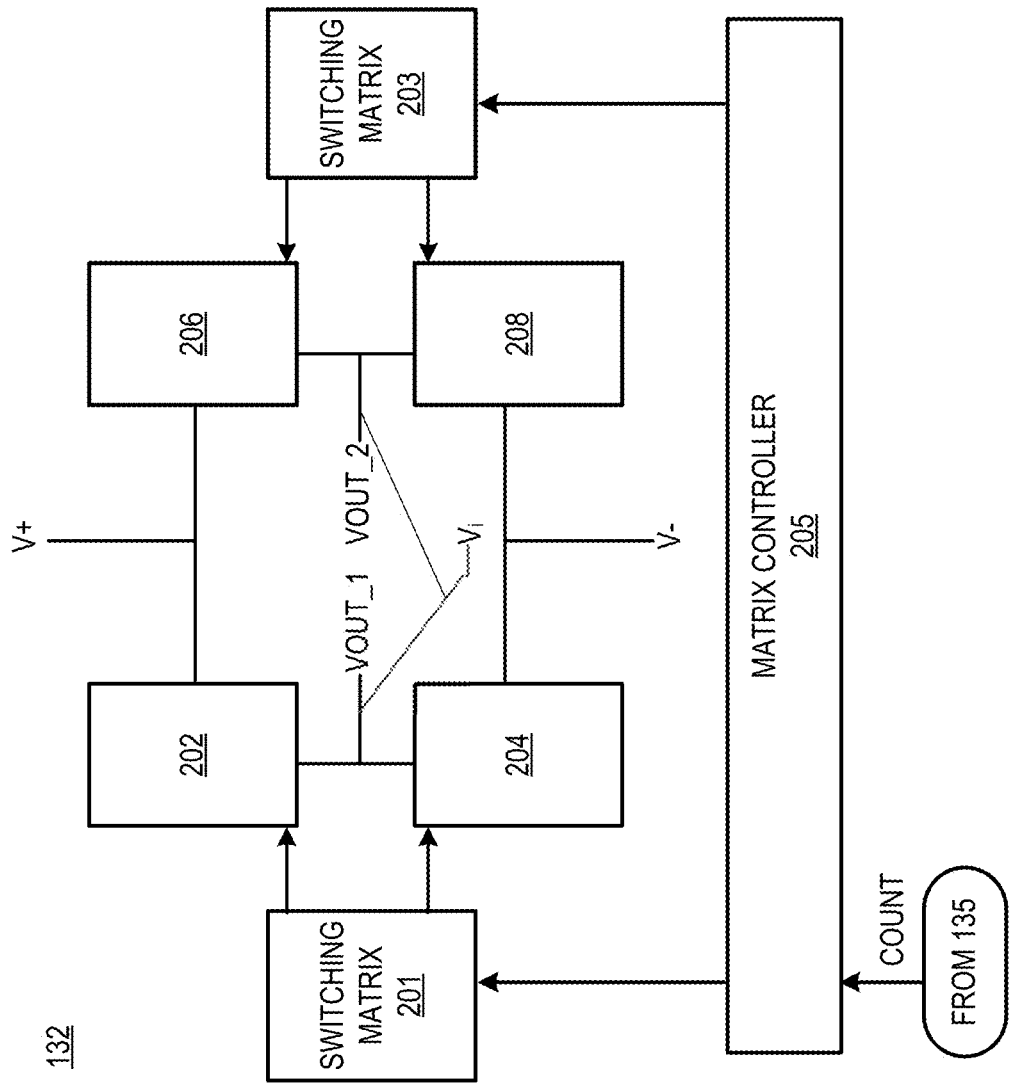
FIG. 2 is a diagram of an example of a sensing bridge, according to aspects of the disclosure.

FIG. 2 is a diagram of sensing bridge 132, according to aspects of the disclosure. As illustrated, sensing bridge 132 may include TMRs 202, 204, 206, and 208, switching matrices 201 and 203, and a matrix controller 205. According to the present example, switching matrix 201 is configured to switch pillars in each of TMRs 202 and 204. However, alternative implementations are possible in which a different switching matrix is provided for each of TMRs 202 and 204. According to the present example, switching matrix 203 is configured to switch pillars in each of TMRs 206 and 208. However, alternative implementations are possible in which a different switching matrix is provided for each of TMRs 206 and 208. Although, in the present example, switching matrix 201 and switching matrix 203 are depicted as separate entities, alternative implementations are possible in which they are integrated with each other. Each of switching matrices 201 and 203 may include a plurality of switches that are configured to connect or disconnect pillars in one of TMRs 202-208 from the rest of the pillars in the same TMR. Matrix controller 205 may include any suitable type of circuitry that is configured to switch on and off each (or at least some) of the switches in switching matrices 201 and 203. By way of example, matrix controller 205 may include a general-purpose processor, a special-purpose processor, an application-specific circuit, and/or any other suitable type of processing circuitry. In one example, matrix controller 205 may be configured to perform a process 500, which is discussed further below with respect to FIG. 5. In some implementations, matrix controller 205 may be provided separately of sensing bridge 132. Additionally or alternatively, in some implementations, matrix controller 205 may be integrated in other circuitry that is part of sensor 100.

Figure 3:
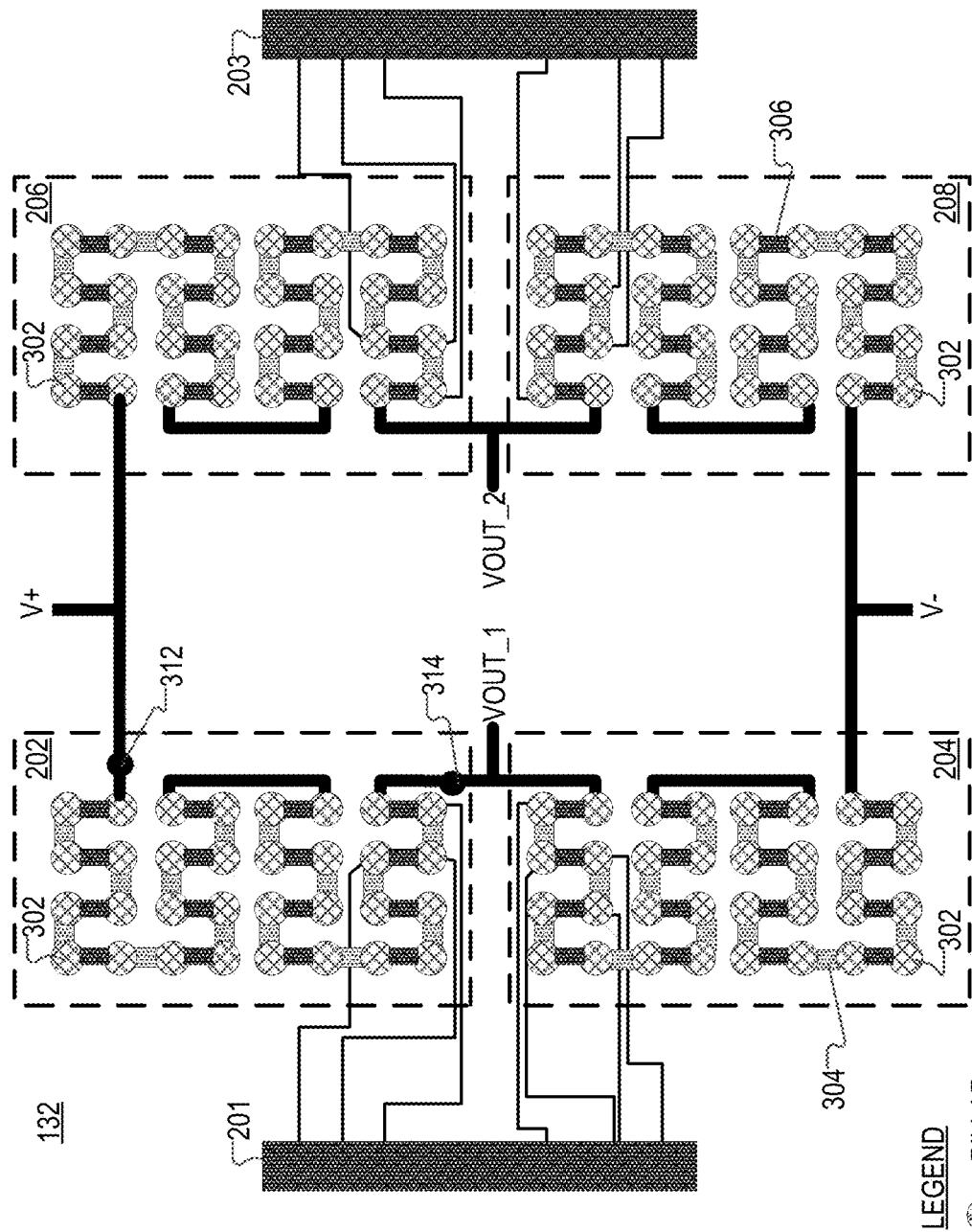
FIG. 3 is a diagram of an example of a sensing bridge, according to aspects of the disclosure.

FIG. 3 shows sensing bridge 132 in further detail. As illustrated, each of TMRs 202, 204, 206, and 208 includes a plurality of pillars 302. The pillars in each of TMRs 202, 204, 206, and 208 may be connected in series to each other. As illustrated in FIG. 3, the connection may be accomplished by using conductors (e.g., conductive traces) that connect the respective tops and bottoms of adjacent pillars 302. However, it will be understood that in some implementations, the pillars in at least one of TMRs 202, 204, 206, and 208 may be connected in parallel with each other. Stated succinctly, the present disclosure is not limited to any specific topology for connecting the pillars 302 in any given one of the TMRs 202, 204, 206, and 208. According to the present example, all of the pillars in any of TMRs 202, 204, 206, and 208 have the same resistance. However, alternative implementations are possible in which at least two pillars 302, any given one of TMRs 202, 204, 206, and 208, have different resistances.

As is well known in the art, a "pillar" is a fundamental structure in a TMR element that consists of several layers of magnetic and non-magnetic materials and is designed to take advantage of the TMR effect. Each of the pillars may have a resistance that varies based on the value of a magnetic field that is incident on the pillar. The pillars in a TMR may be effectively independent sub-units of the TMR, whose resistance varies in proportion with the value of the magnetic field that is incident on them. The total resistance of the TMR may be equal to a combination (e.g., the sum, etc.) of the individual resistances of the pillars.

Individual pillars in a TMR may be online or offline. When a pillar in a TMR is offline, the pillar does not contribute to the total resistance of the TMR. When a pillar in the TMR is online, the pillar contributes to the total resistance in the TMR. The bringing of a pillar online or offline may be performed by using a switching matrix, such as switching matrices 201 and 203. Specifically, switching matrix 201 may be configured to bring online or offline each (or at least some) of the pillars 302 in any given one of TMRs 202 and 204. Similarly, switching matrix 203 may be configured to bring offline or online each (or at least some) of the pillars 302 in any given one of TMRs 206 and 208.

Switching matrix 201 may include a plurality of switches that couple or disconnect from each other the pillars 302 in TMR 202 to bring the total resistance of TMR 202 to a desired first value. Switching matrix 201 may further include a plurality of switches that couple or disconnect from each other the pillars 302 in TMR 204 to bring the total resistance of TMR 204 to a desired second value. Switching matrix 203 may include a plurality of switches that couple or disconnect from each other the pillars 302 in TMR 202 to bring the total resistance of TMR 206 to a desired third value. Switching matrix 201 may further include a plurality of switches that couple or disconnect from each other the pillars 302 in TMR 202 to bring the total resistance of TMR 208 to a desired fourth value. The total resistance of TMRs 202, 204, 206, and 208 may be set independently of each other by switching matrices 201 and 203, such that, at any given time, any two of TMRs 202, 204, 206, and 208 may have the same total resistance values or different total resistance values.

Matrix controller 205 may be configured to control each of the switches in switching matrices 201 and 203. Specifically, matrix controller 205 may be configured to individually turn on and off each of the switches in switching matrices 201 and 203. Each of the switches may be controlled independently of the rest. In some implementations, matrix controller may include logic that is configured to: (i) identify a set of switches (or switching matrix/switching matrix portion) that are configured to connect or disconnect the pillars in the given TMR, (ii) identify a set of states for the set of switches, and (iii) cause the set of switches to assume the set of states. A switch may be either in the turned-on or turned-off state. Identifying the states for the set of switches that corresponds to the desired resistance value includes determining which ones of the switches need to be turned on and which ones of the switches need to be turned off. Identifying the set of states may include retrieving a binary string (also referred to as "a control code"), where each bit in the string corresponds to a different switch. Causing the set of switches to assume the set of states may include: for each of the switches, identifying the bit, in the bit string, that corresponds to the switch, turning on the switch if the bit value is '1', or turning off the switch if the bit value is '0'. The set of bit strings may be retrieved from a memory that is part of matrix controller 205 or from another memory.

Figure 4A:
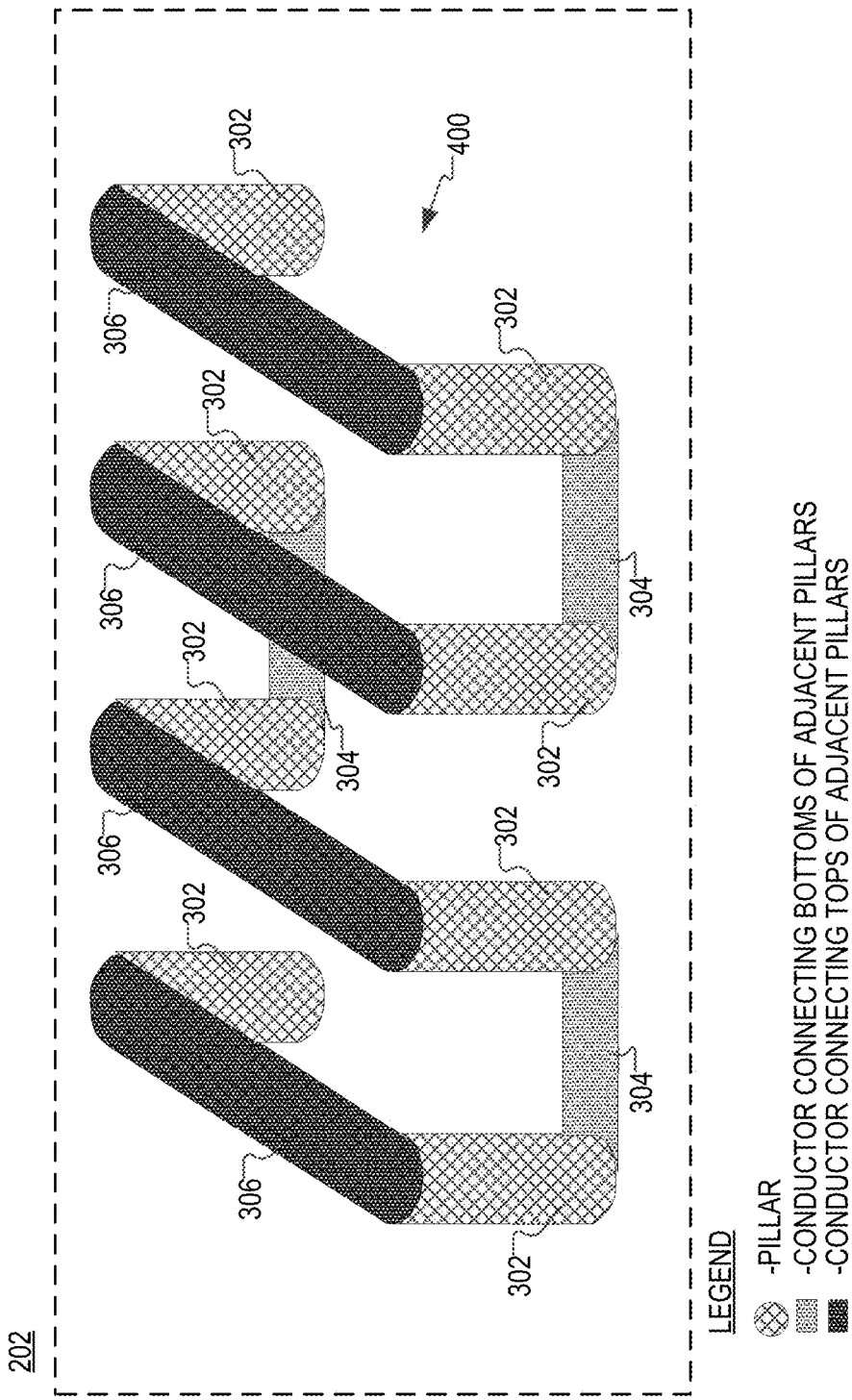
FIG. 4A is a diagram of a sensing element portion, according to aspects of the disclosure.

FIG. 4A shows an example of a TMR portion 400. According to the present example, TMR portion 400 is part of TMR 202. However, in some implementations, TMR portion 400 may be part of any of TMRs 204, 206, and 208. FIG. 4A illustrates that the tops of adjacent pillars 302 may be connected with conductors 306 and the bottoms (or bases) of adjacent pillars may be connected with conductors 304.

Figure 4B:
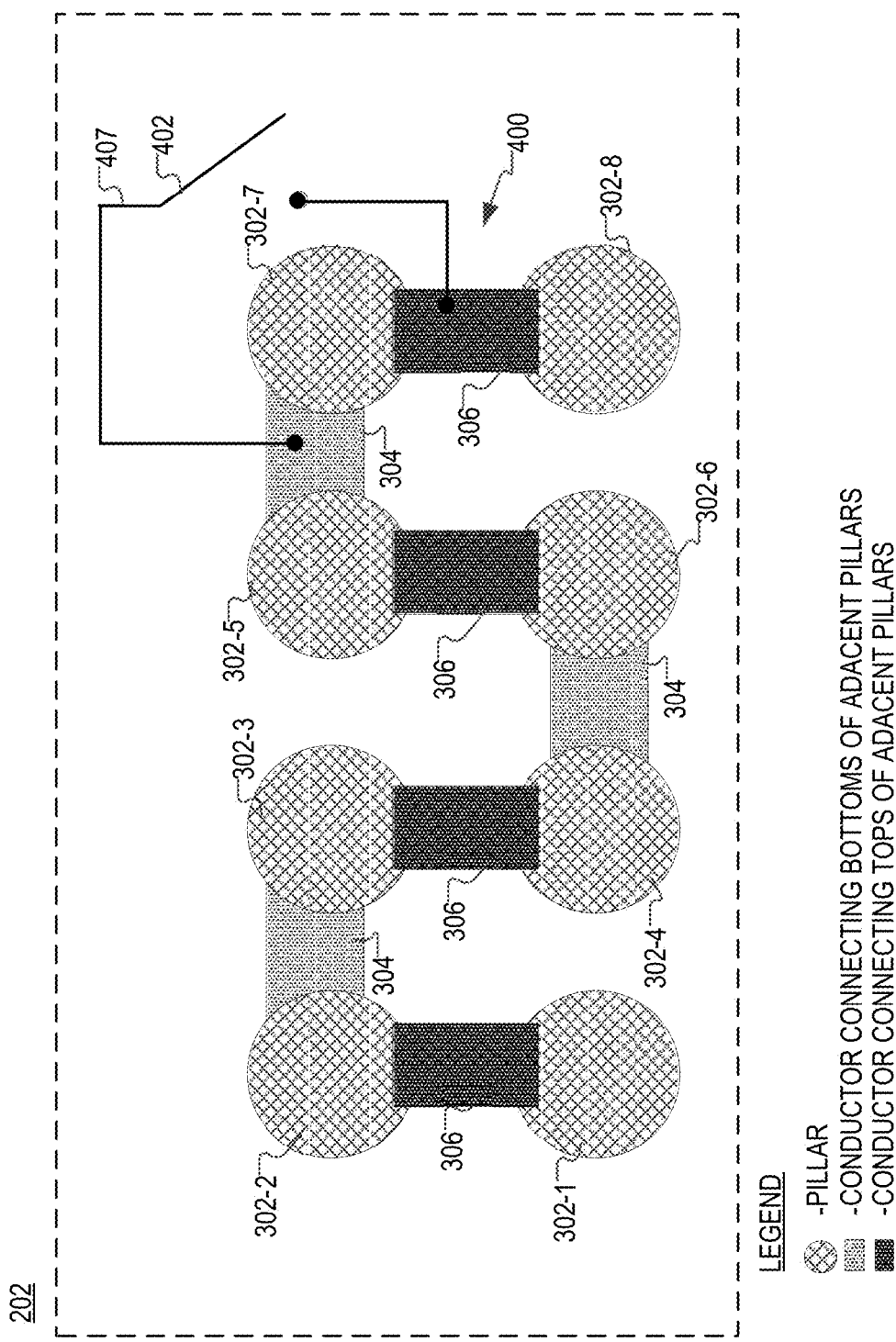
FIG. 4B is a diagram of a sensing element portion, according to aspects of the disclosure.

FIG. 4B shows an example of TMR portion 400, in accordance with another implementation. In the example of FIG. 4B, pillars 302 are enumerated as pillars 302-1, 302-2, 302-3, 302-4, 302-5, 302-6, 302-7, and 302-8. Also shown in FIG. 4B is a switch 402. Switch 402 is an example of a switch that corresponds to pillar 302-7. Switch 402 is configured to bring pillar 302-7 offline or online. When switch 402 is turned off, pillar 302-7 is online. As noted above, when the pillar is said to be online, the individual resistance of pillar 302-7 contributes to the total resistance of TMR portion 400 (and/or TMR 202). In the example of FIG. 4B, when pillar 302-7 is online, the total resistance of TMR portion 400 is equal to the sum of the individual resistances of pillars 302-1, 302-2, 302-3, 302-4, 302-5, 302-6, 302-7, and 302-8. When switch 402 is turned on, pillar 302-7 is offline. Specifically, when switch 402 is turned on, the ends of pillar 302-7 are shorted. As noted above, when pillar 302-7 is said to be offline, the individual resistance of pillar 302-7 does not contribute to the total resistance of TMR portion 400. In the example of FIG. 4B, when pillar 302-7 is offline, the total resistance of TMR portion 400 is equal to the sum of the individual resistance of pillars 302-1, 302-2, 302-3, 302-4, 302-5, 302-6, and 302-8, while pillar 302-7 has no effect on the total resistance, assuming that 402 is ideal (i.e., assuming that the resistance of switch 402 is negligible compared to a single pillar resistance). In the example of FIG. 4B, switch 402 is a part of bypass line 407, and switch 402 is configured to open and close bypass line 407.

In the example of FIGS. 4A-B, TMR portion 400 is part of part of TMR 202 and switch 402 is part of switching matrix 201. Switch 402 is an example of a bypass switch that corresponds to pillar 302-7. A bypass switch corresponds to a pillar, when the switch is configured to short-circuit the pillar and prevent electrical current from flowing through the pillar. In some implementations, switching matrix 201 may include a plurality of bypass switches, wherein each of the bypass switches corresponds to a different pillar 302 in TMRs 202 and 204. In some implementations, switching matrix 203 may include a plurality of bypass switches, wherein each of the bypass switches corresponds to a different pillar 302 in TMRs 206 and 208.

Figure 4C:
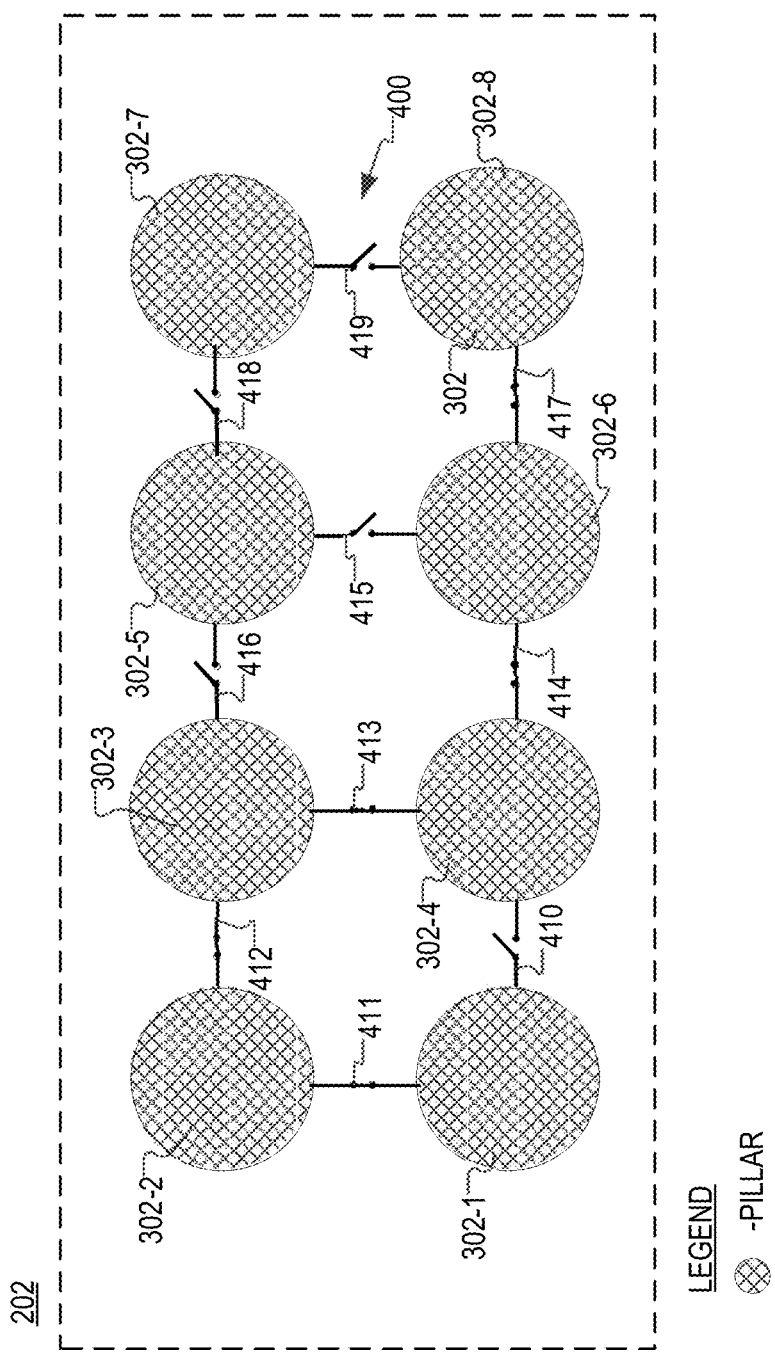
FIG. 4C is a diagram of a sensing element portion, according to aspects of the disclosure.

FIG. 4C is a diagram of TMR portion 400 in accordance with another implementation. In the example of FIG. 4C, pillars 302-1 through 302-8 are interconnected with switches 410-419. Switches 410-419 may be part of switching matrix 201. In the example of FIG. 4C, switches 411, 412, 413, 414, and 417 are turned on, while switches 410, 416, 415, 418, and 419 are turned off. As a result of this arrangement, pillars 302-5 and 302-7 are offline, and pillars 302-1, 302-2, 302-3, 302-4, 302-6, and 302-8 are online. In the example of FIG. 4C, the individual resistances of pillars 302-1, 302-2, 302-3, 302-4, 302-6, and 302-8 contribute to the total resistance of TMR portion 400 and/or TMR 202. In the example of FIG. 4C, the individual resistances of pillars 302-5 and 302-7 do not contribute to the total resistance of TMR portion 400 and/or TMR 202. In the example of FIG. 4C, the total resistance of TMR portion 400 is equal to the sum of the individual resistances of the pillars 302-1, 302-2, 302-3, 302-4, 302-6, and 302-8 (because they are connected in series). If some of pillars 302-1, 302-2, 302-3, 302-4, 302-6, and 302-8 were to be connected in parallel, the total resistance of TMR portion 400 may be calculated differently. In one respect, FIG. 4C is provided to illustrate another example of a topology for the switches in switching matrix 201.

As noted above, a pillar is offline, when the individual resistance of the pillar does not contribute to the total resistance of the TMR of which the pillar is part. Similarly, a pillar is online when the individual resistance of the pillar contributes to the total resistance of the TMR, which the pillar is part of. In the example of FIG. 3, the total resistance of TMR 202 is the resistance between nodes 312 and 314. As illustrated in FIGS. 4B and 4C, bringing offline any of the pillars 302 in TMR 202 may include configuring one or more of the switches in switching matrix 201 to bypass the TMR. Similarly, bringing online any of the pillars 302 in TMR 202 may include configuring any of the switches in switching matrix 201 so that electrical current must flow through the TMR. It will be understood that the present disclosure is not limited to any specific topology for the switches in a switching matrix and/or the pillars in a TMR. Those of ordinary skill in the art will readily recognize, after reading the present disclosure, that there may be a large number of different topologies that would allow pillars in a TMR to be brought online or offline. In some implementations, switching matrix 201 may be configured to bring online or offline (in response to the appropriate control signal from matrix controller 205) any given pillar in TMR 202. Alternatively, in some implementations, matrix controller 205 may be configured to bring online or offline (in response to the appropriate control signal from matrix controller 205) fewer than all pillars in TMR 202. In this case, some of the pillars in TMR 202 may be permanently online, while the rest are able to alternate between being online or offline depending on the state of switching matrix 201.

In one example, switches 410, 416, and 417 may be turned off, and switches 411, 412, 413, 414, 415, 418, and 419 may be turned on. When this is the case, all of pillars 302-1, 302-2, 302-3, 302-4, 302-5, 302-6, 302-7, and 302-8 would be online. If pillar 302-5 were to be brought offline, this could involve turning off switches 415, 416, and 418 and turning on switch 417 to connect pillars 302-7 and 302-8 with the circuit portion including pillars 302-1, 302-2, 302-3, 302-4, and 302-6. In this instance, the set of pillars 302-7 and 302-8 and the set of pillars 302-1, 302-2, 302-3, 302-4, 302-5, and 302-6 are examples of circuit portions that remain after pillar 302-7 is disconnected.

FIG. 5 is a diagram of an example of a process 500, according to aspects of the disclosure. According to the present example, process 500 is performed by matrix controller 205. However, the present disclosure is not limited to any specific entity performing the process 500.

At step 502, matrix controller 205 receives a counter value. The counter value may be the current value of signal COUNT, which is discussed above with respect to FIG. 1A. It will be recalled that signal COUNT is generated by autozero circuit 135.

At step 504, matrix controller 205 selects a state for TMR 202 based on the current value of signal COUNT. The selected state may be the same or different from the current state of TMR 202. When the selected state is different from the current state, matrix controller 205 causes TMR 202 to transition from its current state to the selected state. The transition may be effectuated by at least one of: (i) bringing online one or more pillars 302 that are part of TMR 202 and/or (ii) bringing offline one or more pillars 302 that are part of TMR 202. When the selected state is the same as the current state of TMR 202, matrix controller 205 may do nothing (because the two states are the same anyway). Additionally or alternatively, in some implementations, step 504 may be executed by (i) identifying a control code for TMR 202 based on the current value of signal COUNT and (ii) applying the control code to TMR 202. The application of the control code to TMR 202 may result in a change of the state of the TMR 202 (if the control code corresponds to a state different than the current state of TMR 202), or it can result in no change of the state of TMR 202 (if the control code corresponds to a state that is the same as the current state of TMR 202).

At step 506, matrix controller 205 selects a state for TMR 204 based on the current value of signal COUNT. The selected state may be the same or different from the current state of TMR 204. When the selected state is different from the current state, matrix controller 205 causes TMR 204 to transition from its current state to the selected state. The transition may be effectuated by at least one of: (i) bringing online one or more pillars 302 that are part of TMR 204 and/or (ii) bringing offline one or more pillars 302 that are part of TMR 204. When the selected state is the same as the current state of TMR 204, matrix controller 205 may do nothing (because the two states are the same anyway). Additionally or alternatively, in some implementations, step 506 may be executed by (i) identifying a control code for TMR 204 based on the current value of signal COUNT and (ii) applying the control code to TMR 204. The application of the control code to TMR 204 may result in a change of the state of the TMR 204 (if the control code corresponds to a state different than the current state of TMR 204), or it can result in no change of the state of TMR 204 (if the control code corresponds to a state that is the same as the current state of TMR 204).

At step 508, matrix controller 205 selects a state for TMR 206 based on the current value of signal COUNT. The selected state may be the same or different from the current state of TMR 206. When the selected state is different from the current state, matrix controller 205 causes TMR 206 to transition from its current state to the selected state. The transition may be effectuated by at least one of: (i) bringing online one or more pillars 302 that are part of TMR 206 and/or (ii) bringing offline one or more pillars 302 that are part of TMR 206. When the selected state is the same as the current state of TMR 206, matrix controller 205 may do nothing (because the two states are the same anyway). Additionally or alternatively, in some implementations, step 508 may be executed by (i) identifying a control code for TMR 206 based on the current value of signal COUNT and (ii) applying the control code to TMR 206. The application of the control code to TMR 206 may result in a change of the state of the TMR 206 (if the control code corresponds to a state different than the current state of TMR 206), or it can result in no change of the state of TMR 206 (if the control code corresponds to a state that is the same as the current state of TMR 206).

At step 510, matrix controller 205 selects a state for TMR 208 based on the current value of signal COUNT. The selected state may be the same or different from the current state of TMR 208. When the selected state is different from the current state, matrix controller 205 causes TMR 208 to transition from its current state to the selected state. The transition may be effectuated by at least one of: (i) bringing online one or more pillars 302 that are part of TMR 208 and/or (ii) bringing offline one or more pillars 302 that are part of TMR 208. When the selected state is the same as the current state of TMR 208, matrix controller 205 may do nothing (because the two states are the same anyway). Additionally or alternatively, in some implementations, step 510 may be executed by (i) identifying a control code for TMR 208 based on the current value of signal COUNT and (ii) applying the control code to TMR 208. The application of the control code to TMR 208 may result in a change of the state of the TMR 208 (if the control code corresponds to a state different than the current state of TMR 208), or it can result in no change of the state of TMR 208 (if the control code corresponds to a state that is the same as the current state of TMR 208).

FIG. 5 is provided as an example only. At least some of the steps in process 500 may be performed in a different order, in parallel, or altogether omitted. Although in the example of FIG. 5, the state of each element in sensing bridge 132 is set, alternative implementations are possible in which the states of fewer than all of the sensing elements in sensing bridge 132 are set. In some implementations, at least one of steps 504-510 may be omitted.

FIG. 6 is a diagram of an example of a data structure 600, according to aspects of the disclosure. As illustrated, data structure 600 may include a plurality of entries 604. Each entry 604 may include: (i) an indication of a value of the signal COUNT, and (ii) an indication of a control code set that corresponds to the value of signal COUNT. In other words, data structure 600 is used to index different control code sets to different values of signal COUNT (or to different numerical identifiers). Each entry 604 in data structure 600 may include a different value of signal COUNT. Furthermore, in some implementations, each entry in data structure 600 may include a different control code set.

The control code set in any of entries 604 may include a plurality of control codes. The plurality of control codes may be concatenated into a single word or they may be provided as separate words. The plurality of control codes may include a first control code corresponding to TMR 202, a second control code corresponding to TMR 204, a third control code corresponding to TMR 206, and a fourth control code corresponding to TMR 208. Although, in the present example, each control code set includes control codes for each of the TMRs in sensing bridge 132, alternative implementations are possible in which each control code set includes control codes for fewer than all TMRs in sensing bridge 132.

An example of a control code is now provided in further detail. As noted above, a given TMR may include a set of one or more pillars that are capable of being brought online and offline. Each pillar in the set may be associated with one or more switches that determine whether the pillar is online or offline. The entire set of pillars may thus be associated with a set of switches, wherein, for any given pillar in the set of pillars, the set of switches includes one or more switches that determine whether the pillar is offline. The control code may include a plurality of bits, where each bit corresponds to a different switch in the set of switches. For example, the first bit in the control code may correspond to a first switch in the set of switches, the second bit in the control code may correspond to a second switch in the set of switches, the third bit in the control code may correspond to a third switch in the set of switches, and so forth. The value of each bit in the control code determines whether the bit's corresponding switch should be turned off or on. For example, if a bit in the control code has the value of '1', this means that the bit's corresponding switch should be turned on. If the same bit has the value of '0', this means that the bit's corresponding switch should be turned off. Applying the control code to the given TMR thus means switching on or off each of the switches in the set as specified by the switch's corresponding bit. As can be readily appreciated, bringing online (or offline) one or more pillars in a TMR may change the total resistance of the TMR.

Steps 504-510 involve selecting a state for each of TMRs 202-208. As noted above, selecting a state for each of TMRs 202, 204, 206, and 208 may involve using the value of signal COUNT (received at step 502) to perform a search of data structure 600, and retrieve a control code set as a result of the search. The retrieved control code set may mapped to the value of signal COUNT by data structure 600. After the control code set is retrieved, each control code in the set may be applied to the control code's corresponding TMR.

FIG. 6 is provided to illustrate one possible way in which different control codes (or control code sets) could be indexed to corresponding numerical identifiers. The present disclosure is not limited to any specific method for identifying a control code based on a numerical identifier (which is represented by the value of signal COUNT). For example, in some implementations, the indexing of control codes to corresponding numerical identifiers may be implemented by using digital logic. As another example, the counter values (shown in entries 604) may be specified implicitly by the ordering in which the sets of control codes are stored in a memory (or memory block). As yet another example, the use of control codes may be omitted, and instead, the matrix controller 205 may use digital logic to gate the state of the switches in switching matrices 201 and 203 to the values of signal COUNT. Stated succinctly, the present disclosure is not limited to any specific method for associating the value of signal count to a corresponding state of each of a plurality of switches.

Although data structure 600 is depicted as a table, the present disclosure is not limited to any specific implementation of data structure 600. For example, data structure 600 may be implemented as a set of 2-element arrays that are completely independent of each other, as a search tree, and/or in any other suitable manner. As used throughout the disclosure, the term "data structure" may refer to one or more memory locations, which may or may not be contiguous.

Figure 7:
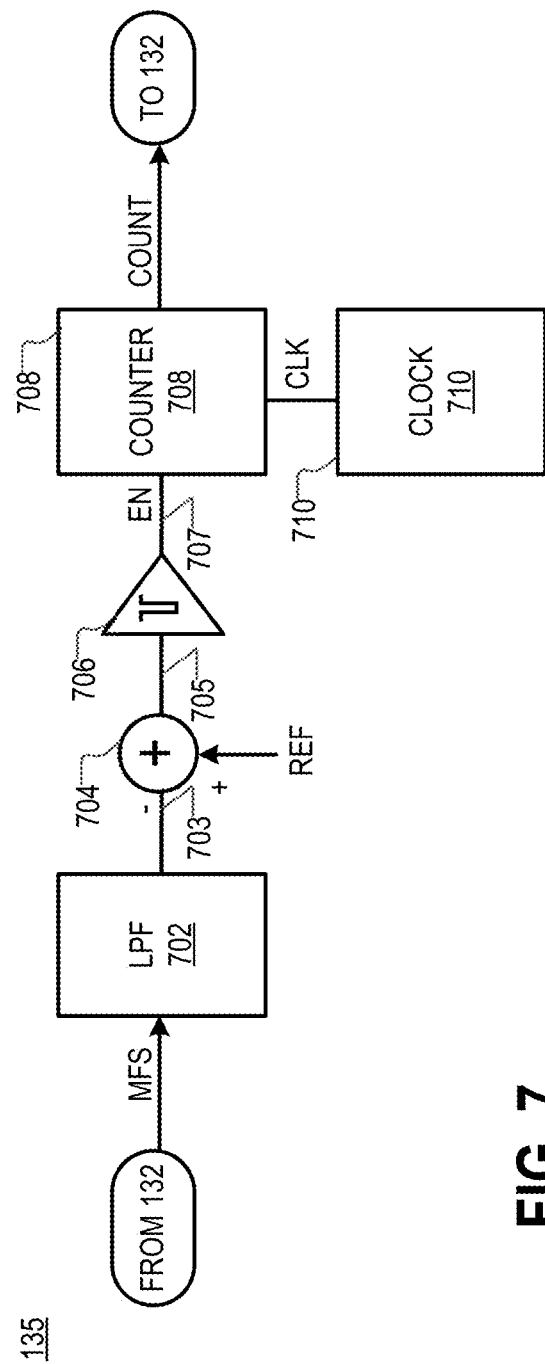
FIG. 7 is a diagram of an example of an autozero circuit, according to aspects of the disclosure.

FIG. 7 is a diagram of the autozero circuit 135, according to aspects of the disclosure. As illustrated, autozero circuit 135 may include a low-pass filter (LPF) 702, an addition unit 704, a counter 708, and a clock 710. Low-pass filter 702 may receive the signal $V_i$ from sensing bridge 132. In one example, signal $V_i$ may be a differential signal having components VOUT_1 and VOUT_2 (shown in FIG. 2), and it may be a high frequency signal that is modulated at the first frequency F1. (See FIG. 1A.) As discussed above with respect to FIG. 1A, signal $V_i$ may be an alternating current (AC) signal. Additionally or alternatively, in some implementations, signal $V_i$ may be a signal that is generated in response to a magnetic field produced by a rotating target or an electrical conductor having electrical current running therethrough. LPF 702 may filter signal $V_i$ to extract a direct current (DC) offset 703 that is present in signal $V_i$. In one implementation, LPF 702 may have a cutoff frequency F2 that is less than the first frequency F1, so that the LPF 702 would pass through all (or at least some) frequencies that are less than or equal to the first frequency F1. The first frequency F1 is discussed above with respect to FIG. 1A.

Addition unit 704 may add a value of REF to the offset 703, and output a signal 705 to comparator 706. According to the present example REF=0, and the value of signal 705 is the same as the value of signal 703. However, alternative implementations are possible in which REF has a non-zero value, in which case the value of signals 705 would be equal to the sum of signal 705 and signal REF. Under the nomenclature of the present disclosure, each of signals 705 and 703 may be referred to as an offset signal (or offset). Although, in the present example, signals 703 and 705 are generated using a low-pass filter, alternative implementations are possible when signals 703 and 705 are generated using a band-pass filter and/or any other suitable type of filter. Signals 703 and 705 represent a DC offset that is present in signal $V_i$. The offset may be caused by the presence of stray fields combined with a resistive imbalance in sensing bridge 132.

Comparator 706 may be any suitable type of comparator, such as a window comparator, a Schmitt trigger, or a single-threshold comparator. Comparator 706 may determine whether the value of signal 705 is within predetermined bounds. Determining whether signal 705 is within predetermined bounds may include detecting whether signal 705 is greater than a threshold T1 and smaller than a threshold T2. If signal 705 is greater than threshold T1 and smaller than threshold T2, signal 705 may be said to be within the predetermined bounds. Otherwise, if signal 705 is smaller than or equal to threshold T1 or greater than or equal to threshold T2, signal 705 may be said to be outside of the predetermined bounds. In another example, determining whether signal 705 is within predetermined bounds may include detecting whether the value of signal 705 is smaller than a threshold T3. If the value of signal 705 is smaller than threshold T3, signal 705 may be said to be within the predetermined bounds. If the value of signal 705 is greater than or equal to threshold T3, signal 705 may considered outside of the predetermined bounds.

Comparator 706 may output a signal 707. Specifically, comparator 706 may set the value of signal 707 to '1' when the value of signal 705 is within the predetermined bounds. On the other hand, if the value of signal 705 is outside of the predetermined bounds, comparator 706 may set the value of signal 707 to '0'. In the present example, signal 707 is used to enable or disable counter 708. In the present example, when signal 707 is set to '1', counter 708 is enabled. When signal 707 is set to '0' counter 708 is disabled.

Clock 710 is used to drive counter 708 with a clock signal CLK. When counter 708 is enabled, the output of counter 708 is incremented in each cycle of signal CLK until a maximum value is reached, at which time the output of counter 708 is rolled back to an initial value. On the other hand, when counter 708 is disabled, the output of counter 708 stays the same. The output of counter 708 is the signal COUNT which is discussed above with respect to FIGS. 1A and 5. Under the present arrangement, the value of signal COUNT would be updated every time the value of signal 705 is outside of the predetermined bounds. In some implementations, matrix controller 205 may monitor whether the value of signal COUNT is updated, and execute process 500 if and only if the value of signal COUNT is updated.

In some respects, the system discussed with respect to FIGS. 1A-7 may be used to correct a resistive imbalance between TMRs 202, 204, 206, and 208. A resistive imbalance may result in an imbalance of sensing bridge 132 and a degraded common mode response ratio (CMRR). Moreover, it can result in a ripple (e.g., modulated offset) that cannot be removed by amplifier 140, and is thus propagated in the output of amplifier 140 (e.g., see FIG. 1A). The ripple may result from sensing bridge 132 being subjected to stray fields while experiencing a resistive imbalance. The process discussed with respect to FIGS. 5-7 is advantageous because prevents such a ripple from being propagated and thus improves the accuracy of magnetic field sensor 100. If the ripple is not eliminated, this would create an excessive current consumption through secondary coil 106 (shown in FIG. 1A), which would increase the residual offset in magnetic field sensor 100. The excessive current consumption may result from the ripple being fed back into the secondary coil 106. The use of autozero circuit 135 does not have an associated noise penalty. Specifically, the use of autozero circuit 135 may lead to increased noise in the low-frequency band (i.e., a band below modulating frequency F1), but this would not affect negatively the operation of magnetic field sensor 100 because the useful signal lives in a high-frequency band (e.g., a band centered on frequency F1, etc.). In general, the use of autozero circuit 135 leads to improved CMRR and increased stray field immunity.

The phrase "two TMRs have the same resistance," as used throughout the disclosure shall mean that the two TMRs will exhibit the same resistance when they are exposed to the same magnetic field (or when the two TMRs experience the same density and direction of magnetic flux). The phrase "two TMRs have different resistances," as used throughout the disclosure shall mean that the two TMRs will exhibit different resistances when they are exposed to the same magnetic field (or when the two TMRs experience the same density and direction of magnetic flux). Two resistances may be considered the same when the difference between the resistances is smaller than a threshold value. On the other hand, two resistances may be considered different when the difference between the two resistances is greater than the threshold value. As can be readily appreciated, in practice, it may be impossible for the resistances of two TMRs to be exactly the same due to manufacturing tolerances or other similar factors.

In one respect, the process discussed with respect to FIGS. 1A-7 involves matrix controller 205 cycling through a different set of control codes every time a low-frequency component in the output of sensing bridge 132 is out of bounds until a set of control codes is applied to the TMRs in sensing bridge 132 which leads to the low-frequency components staying within the predetermined bounds. Each set of control codes is indexed to a different value of the signal COUNT. The indexing may be performed by using a data structure, digital logic, and/or any other suitable manner. The value of signal count is updated (e.g., incremented) when the low-frequency component is found to be out of bounds. The value of signal count may not be updated (i.e., it may stay the same) when the low-frequency component is within the bounds. At the very least, every time a new set of control codes is applied to the TMRs in sensing bridge 132, at least one pillar 302, in at least one of TMRs 202, 204, 206, and 208, would be brought either online or offline, which in turn changes the total resistance of the TMR of which the pillar 302 is part. When the low-frequency component is in-bounds, this means that the resistances of the TMRs in sensing bridge 132 are substantially balanced. When the low-frequency component is out-of-bonds, this could mean that sensing bridge 132 is experiencing a restive imbalance caused by at least one of the TMRs in sensing bridge 132 having a resistance that is greater (by a predetermined threshold) than the resistance of another one of the TMRs in sensing bridge 132.

The concepts and ideas presented throughout the disclosure are not limited to TMRs or magnetic field sensors. The concepts and ideas presented throughout the disclosure can be applied to any resistive-type sensor that includes a plurality of resistive-type sensing elements, where each sensing element is formed of sub-units coupled in series (or in parallel, etc.). In general, a resistive-type sensing element may be any sensing element whose resistance changes in response to changes in a stimulus. Examples of resistive-type sensing elements include a strain gauge, a thermistor, a light-dependent resistor (LDR), a humidity sensing element, a gas sensor, a force-sensitive resistor, or a flex-sensor. A resistive-type sensing element may include a circuit comprising a plurality of individual sensing elements. For example, a thermistor may include a series of thermistors (i.e., resistive elements) that are arranged to function collectively as a unified thermistor. A force-sensitive resistor may include a circuit of force-sensitive resistors (i.e., resistive elements) that are arranged to function collectively as a unified force-sensitive resistor. A strain gauge element may include a circuit of strain gauge elements (i.e., resistive elements) that are arranged to function collectively as a unified strain gauge element. A photoresistor may include a circuit of photoresistors (i.e., resistive elements) that are arranged to function collectively as a unified photoresistor. A humidity sensing element may include a circuit of humidity sensing elements (i.e., resistive elements) that are arranged to function collectively as a unified humidity sensing element. A gas-sensing element may include a circuit of gas-sensing elements (i.e., resistive elements) that are arranged to function collectively as a unified big gas-sensing element. A flex sensor may include a plurality of flex sensors (i.e., resistive elements) that are arranged to function collectively as a unified flex sensor. In the discussion with respect to FIGS. 1A-7, TMR 202 is an example of a "unified sensing element" that is composed of multiple smaller constituent sensing elements that have the same functionality. As discussed above, TMR 202 is composed of multiple pillars that each have a resistance which changes when the pillar is subjected to a magnetic field. Although, in the example of FIG. 1A, magnetic field sensor 100 is a closed loop system, it will be understood that the concepts and ideas presented throughout the disclosure can be used in open-loop systems, as well, and in particular open-loop systems that are configured to sense high-frequency magnetic fields.

A magnetic-field sensing element can be, but is not limited to, a Hall Effect element a magnetoresistance element, or an inductive coil. As is known, there are different types of Hall Effect elements, for example, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb). The phrase "set of magnetic field elements" shall mean "one or more magnetic field sensing elements". For example, and without limitation, each or any of sensing elements 202, 204, 2 may include any of the listed magnetic field sensing element types. As used throughout the disclosure, the phrase "current value of signal COUNT" refers to the instant or present value of signal COUNT, rather than a current level.

The concepts and ideas described herein may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special-purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, or volatile memory. The term unit (e.g., an addition unit, a multiplication unit, etc.), as used throughout the disclosure may refer to hardware (e.g., an electronic circuit) that is configured to perform a function (e.g., addition or multiplication, etc.), software that is executed by at least one processor, and configured to perform the function, or a combination of hardware and software.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A system, comprising:
    a sensing element including a plurality of resistive elements that are configured to form a circuit;
    a switching matrix that is configured to change a total resistance of the sensing element by bringing online or offline one or more of the plurality of resistive elements, the total resistance of the sensing element, at any point in time, being based on respective resistances of only those of the plurality of resistive elements that are currently online;
    a matrix controller that is configured to detect when a value of a counter signal is updated and cause the switching matrix to change the total resistance of the sensing element by bringing offline or online one or more of the plurality of resistive elements based on the value of the counter signal, wherein the causing step is performed when the value of the counter signal is updated; and a counter signal generator configured to detect whether an offset signal satisfies a predetermined condition and update the value of the counter signal in response to the offset signal satisfying the predetermined condition.

2. The system of claim 1, wherein the counter signal generator causes the matrix controller to cycle through different ones of a plurality of total resistance values of the sensing element until the predetermined condition becomes satisfied by the offset signal, each of the plurality of total resistance values being mapped to a respective value of the counter signal.

3. The system of claim 1, wherein bringing online any given one of the resistive elements includes causing the given resistive element to contribute to the total resistance of the sensing element, and bringing offline the given resistive element includes preventing the given resistive element from contributing to the total resistance of the sensing element.

4. The system of claim 1, wherein the predetermined condition is satisfied when the offset signal is outside of predetermined bounds.

5. The system of claim 1, wherein the sensing element includes a magnetic field sensing element.

6. The system of claim 1, wherein the sensing element includes a tunneling magnetoresistance element (TMR), and each of the resistive elements includes a pillar.

7. The system of claim 1, wherein each of the resistive elements includes one of a strain gauge element, a thermistor, a photoresistor, a humidity sensing element, a gas sensing element, a force-sensitive resistor, or a flex sensor.

8. The system of claim 1, wherein the offset signal is generated based on a sensing signal, the sensing signal is at least in part generated by the sensing element, the sensing element is part of a sensing bridge, the sensing signal is a differential signal that is output from the sensing bridge, the sensing signal is an alternating current (AC) signal, and the offset signal is indicative of a magnitude of a direct current (DC) offset that is present in the AC signal due to a resistive imbalance in the sensing bridge.

9. The system of claim 1, wherein the offset signal is generated based on a sensing signal, the sensing signal is at least in part generated by the sensing element, the counter signal generator includes a low-pass filter, a counter, and a comparator that is configured to supply an enable signal to the counter, the low-pass filter being configured to generate the offset signal by filtering the sensing signal, the comparator being configured to set the enable signal to a predetermined value when the offset signal is outside of predetermined bounds, the value of the counter signal being updated when the enable signal is set to the predetermined value.

10. The system of claim 1, wherein the offset signal is generated based on a sensing signal that is at least in part generated by the sensing element, the sensing element is part of a sensing bridge and the sensing signal is a differential signal that is output by the sensing bridge.

11. The system of claim 1, wherein:
the switching matrix includes a plurality of switches, each of the plurality of switches being arranged to bypass a different one of the plurality of resistive elements, and
the matrix controller includes electronic circuitry that is configured to independently turn on and off each of the plurality of switches.

12. The system of claim 1, wherein bringing offline any given one of the plurality of resistive elements includes closing a respective bypass line to short-circuit the given resistive element, and bringing the given resistive element online includes opening the respective bypass line.

13. The system of claim 1, wherein bringing offline any given one of the plurality of resistive elements includes disconnecting the given resistive element from the circuit and connecting to each other portions of the circuit that remain after the disconnection of the given resistive element.

14. A system, comprising:
a magnetic field sensing element including a plurality of resistive elements that are configured to form a circuit;
a switching matrix that is configured to change a total resistance of the magnetic field sensing element by bringing online or offline one or more of the plurality of resistive elements, the total resistance of the magnetic field sensing element, at any point in time, being based on respective resistances of only those of the plurality of resistive elements that are currently online;
a matrix controller that is configured to detect when a value of a counter signal is updated and cause the switching matrix to change the total resistance of the magnetic field sensing element by bringing offline or online one or more of the plurality of resistive elements based on the value of the counter signal, wherein the causing step is performed when the value of the counter signal is updated; and
a counter signal generator configured to detect whether an offset signal is outside of predetermined bounds, and update the value of the counter signal in response to the offset signal being outside of the predetermined bounds.

15. The system of claim 14, wherein the counter signal generator causes the matrix controller to cycle through different ones of a plurality of total resistance values of the magnetic field sensing element until the offset signal falls within the predetermined bounds, each of the plurality of total resistance values being mapped to a respective value of the counter signal.

16. The system of claim 14, wherein bringing online any given one of the resistive elements includes causing the given resistive element to contribute to the total resistance of the magnetic field sensing element, and bringing offline the given resistive element includes preventing the given resistive element from contributing to the total resistance of the magnetic field sensing element.

17. The system of claim 14, wherein the magnetic field sensing element includes a tunneling magnetoresistance element (TMR) and each of the plurality of resistive elements includes a pillar.

18. The system of claim 14, wherein the offset signal is generated based on a sensing signal, the sensing signal is at least in part generated by the sensing element, the counter signal generator includes a low-pass filter, a counter, and a comparator that is configured to supply an enable signal to the counter, the low-pass filter being configured to generate the offset signal by filtering the sensing signal, the comparator being configured to set the enable signal to a predetermined value when the offset signal is outside of predetermined bounds, the value of the counter signal being updated when the enable signal is set to the predetermined value.

19. The system of claim 14, wherein the offset signal is generated based on a sensing signal, the sensing signal is at least in part generated by the sensing element, the magnetic field sensing element is part of a sensing bridge, and the sensing signal is generated by the sensing bridge.

20. The system of claim 14, wherein:
the switching matrix includes a plurality of switches, each of the plurality of switches being arranged to bypass a different one of the plurality of resistive elements when the switch is turned on, and the matrix controller includes electronic circuitry that is configured to independently turn on and off each of the plurality of switches.

21. The system of claim 14, wherein bringing offline any given one of the plurality of resistive elements includes closing a respective bypass line to short-circuit the given resistive element, and bringing the given resistive element online includes opening the respective bypass line.

22. The system of claim 14, wherein bringing offline any given one of the plurality of resistive elements includes disconnecting the given resistive element from the circuit and connecting to each other portions of the circuit that remain after the disconnection of the given resistive element.

23. A system, comprising:
a sensing bridge including a plurality of magnetic field sensing elements, each of the plurality of magnetic field sensing elements including a different respective set of resistive elements, each respective set of resistive elements being configured to form a different one of a plurality of circuits;
a switching matrix that is configured to change a respective total resistance of any of the plurality of magnetic field sensing elements by bringing online or offline one or more of the resistive elements that are part of that magnetic field sensing element, the respective total resistance of each of the plurality of magnetic field sensing elements, at any point in time, being based on respective resistances of only those of the resistive elements that are part of the magnetic field sensing element which are currently online;
a matrix controller that is configured to detect when a value of a counter signal is updated and cause the switching matrix to change the respective total resistance of at least one of the plurality of magnetic field sensing elements based on the value of the counter signal, wherein the causing step is performed when the value of the counter signal is updated;
a counter signal generator configured to update the value of the counter signal when a predetermined condition is satisfied by an offset signal that is associated with the sensing bridge.

24. The system of claim 23, wherein the predetermined condition is satisfied when the offset signal is within predetermined bounds.

25. The system of claim 23, wherein the counter signal generator causes the matrix controller to cycle through a plurality of sets of resistance values for the plurality of magnetic field sensing elements until the predetermined condition becomes satisfied by the offset signal, each of the plurality of sets being mapped to a different value of the counter signal.

26. The system of claim 23, wherein, when the value of the counter signal is updated, the matrix controller is configured to select a corresponding control code for each of the plurality of magnetic field sensing elements and apply the corresponding control code.

27. The system of claim 23, wherein each of the plurality of magnetic field sensing elements includes a tunneling magnetoresistance element (TMR), and the set of resistive elements in any of the plurality of magnetic field sensing elements includes a set of pillars.

28. The system of claim 23, wherein the offset signal is generated based on a sensing signal, the sensing signal is at least in part generated by the sensing bridge, the counter signal generator includes a low-pass filter, a counter, and a comparator that is configured to supply an enable signal to the counter, the low-pass filter being configured to generate the offset signal by filtering the sensing signal, the comparator being configured to set the enable signal to a predetermined value when the offset signal is outside of predetermined bounds, the value of the counter signal being updated when the enable signal is set to the predetermined value.

29. The system of claim 23, wherein bringing offline a given resistive element in any of the plurality of magnetic field sensing elements includes closing a respective bypass line to short-circuit the given resistive element, and bringing the given resistive element online includes opening the respective bypass line.

30. The system of claim 23, wherein bringing offline a given resistive element in any of the plurality of magnetic field sensing elements includes disconnecting the given resistive element from one of the plurality of circuits.

31. The system of claim 23, wherein the offset signal is generated based on a sensing signal, the sensing signal is at least in part generated by the sensing bridge, the sensing signal is an alternating current (AC) signal, and the offset signal is indicative of a magnitude of a direct current (DC) offset that is present in the AC signal due to a resistive imbalance in the sensing bridge.

* * * * *